US007421339B2

(12) United States Patent
Jeon

(10) Patent No.: US 7,421,339 B2
(45) Date of Patent: Sep. 2, 2008

(54) APPARATUS AND METHOD FOR CONTROLLING TRAFFIC INFORMATION DISPLAY IN NAVIGATION SYSTEM

(75) Inventor: Jung Koo Jeon, Arryang-si (KR)

(73) Assignee: LG Electronics Inc., Seoul (KR)

( * ) Notice: Subject to any disclaimer, the term of this patent is extended or adjusted under 35 U.S.C. 154(b) by 584 days.

(21) Appl. No.: 10/859,979

(22) Filed: Jun. 4, 2004

(65) Prior Publication Data
US 2004/0249566 A1 Dec. 9, 2004

(30) Foreign Application Priority Data
Jun. 5, 2003 (KR) ...................... 10-2003-0036507

(51) Int. Cl.
*G01C 21/00* (2006.01)
(52) U.S. Cl. .................... 701/207; 701/200; 701/25; 701/211; 340/988; 340/995.1; 340/995.12; 342/357.06
(58) Field of Classification Search ................. 340/905, 340/990–991, 995, 995.1, 995.11–995.13, 340/995.27, 988; 700/201–202, 206–215; 701/117–210, 211–215, 25; 342/357.09, 342/357.1, 357.06, 357.12
See application file for complete search history.

(56) References Cited

U.S. PATENT DOCUMENTS

| 5,831,552 | A  | * | 11/1998 | Sogawa et al. ......... 340/995.27 |
| 5,931,888 | A  | * | 8/1999  | Hiyokawa .................... 701/208 |
| 6,574,555 | B2 | * | 6/2003  | Mochizuki et al. .......... 701/211 |
| 6,707,421 | B1 | * | 3/2004  | Drury et al. .............. 342/357.1 |
| 6,862,524 | B1 | * | 3/2005  | Nagda et al. ................. 701/209 |
| 6,865,480 | B2 | * | 3/2005  | Wong ......................... 701/210 |
| 6,911,918 | B2 | * | 6/2005  | Chen ..................... 340/995.13 |
| 7,020,556 | B2 | * | 3/2006  | Kim ........................... 701/213 |
| 2003/0018428 | A1 |  | 1/2003 | Knockeart et al. |
| 2005/0165547 | A1 | * | 7/2005 | Uotani ....................... 701/210 |

FOREIGN PATENT DOCUMENTS

| CN | 1311887 A   | 9/2001 |
| JP | 2002-71365 A | 3/2002 |

* cited by examiner

*Primary Examiner*—Yonel Beaulieu
(74) *Attorney, Agent, or Firm*—Birch, Stewart, Kolasch & Birch, LLP

(57) ABSTRACT

A navigation system displays different colors on sections of a travel route according to traffic density. A method for controlling a traffic information display in the navigation system includes the steps of: if a traveling route is received from a user of a moving object, displaying and guiding a corresponding travel route; determining whether or not traffic density information is requested during travel of the moving object; if the traffic density information is requested, receiving the traffic density information of the travel route from a traffic information center and searching for a predetermined color stored in a storage unit based on the received traffic density information; and displaying the predetermined color on the corresponding section of the travel route.

23 Claims, 9 Drawing Sheets

APPARATUS AND METHOD FOR CONTROLLING TRAFFIC INFORMATION DISPLAY IN NAVIGATION SYSTEM

The present application claims, under 35 U.S.C. § 119, the benefit of Korean Patent Application No. 36507/2003 filed Jun. 5, 2003, the entire content of which is fully incorporated herein by reference.

BACKGROUND OF THE INVENTION

1. Field of the Invention

The present invention relates to a navigation system, and more particularly, to an apparatus and method for controlling a traffic information display in a navigation system, which is capable of displaying colors corresponding to traffic density of a travel route on a screen.

2. Description of the Related Art

In general, a navigation system displays a current location of a moving object on a map, which is displayed on a screen. The current location is calculated using information that is received from a global positioning system (hereinafter, referred to as a "GPS").

Additionally, the navigation system provides a driver with a variety of information necessary for a travel route of the moving object, including a travel direction of the moving object, a distance to a desired destination, a current travel velocity of the moving object, a route previously set by a driver, an optimum route to the destination, and so forth. The term velocity is intended to encompass the scalar parameter speed as well as the vector parameter velocity.

The navigation system (or GPS) may be installed in various kinds of moving objects, such as vessels, airplanes and automobiles, and is widely used to check a current location and travel velocity of the moving object or to determine a travel route of the moving object. Specifically, the navigation system receives radio waves indicating latitude, longitude and altitude from a plurality of GPS satellites, performs a calculation operation, and visually and/or audibly informs the driver with map information including the current location of the moving object.

FIG. 1 is a construction of a related navigation system.

Referring to FIG. 1, a GPS receiver 102 receives predetermined location data through an antenna for the purpose of a navigation service. Here, the location data are transmitted from a plurality of GPS satellites 100. A velocity sensor/gyro sensor 104 constitutes a sensor part and senses a rotational angle and velocity of a moving object.

An input unit 106 is a user interface configured to receive various input key signals from a user and set a travel route.

A map data storage unit 108 stores map data and other additional information data. In general, the map data storage unit 108 is implemented with compact disk-read only memory (CD-ROM). ROM).

A control unit 110 controls an overall operation of the navigation system. The control unit 110 determines a current location of the moving object by using a reception signal of the GPS receiver 102 and matches the determined current location with the map data stored in the map data storage unit 108.

In case the user inputs an origin and a destination through the input unit 106, the control unit 110 searches to determine a travel route from the current location of the moving object to the destination by referring to the map data stored in the map data storage unit 108. The searched and determined travel route is displayed on a digital map of a display unit 114 through a display driving unit 112.

Additionally, the travel route of the moving object can be guided using a guidance voice that is outputted through a speaker 118 by a voice guidance unit 116.

The navigation system receives GPS satellite signals from the plurality of GPS satellites 100 located over the earth and checks the current location and the travel direction of the moving object to thereby track a travel trace. Additionally, the navigation system provides the driver with the shortest route among several travel routes from the origin to the destination.

Meanwhile, if information on a specific area is requested, the related navigation system provides traffic information on the specific area to a mobile telephone in a message form. The traffic information may be displayed in the form of text information on an electronic display board, which is a traffic information display unit installed on a road.

However, since such traffic information is provided in a form of text information, the amount of information is very large and mostly incorrect. Specifically, even if the moving object requests information on a road in a specific area, the requested information is not provided in a satisfactory form. Accordingly, the related navigation system has problems in that the traffic information has low reliability and it is impossible to actively cope with traffic conditions until the destination is reached.

SUMMARY OF THE INVENTION

Accordingly, the present invention is directed to an apparatus and method for controlling a traffic information display in a navigation system that substantially obviates one or more problems due to limitations and disadvantages of the related art.

It is an object of the present invention to provide an apparatus and method for controlling a traffic information display in a navigation system, in which different colors are displayed according to traffic density of a travel route.

It is another object of the present invention to provide an apparatus and method for controlling a traffic information display in a navigation system, in which different colors are displayed according to traffic density based on sections of a travel route.

It is further another object of the present invention to provide an apparatus and method for controlling a traffic information display in a navigation system, in which different colors are displayed on sections of a travel route according to congestion degrees, velocity data and traffic conditions based on the travel route sections.

Additional advantages, objects, and features of the invention will be set forth, in part, in the description which follows and, in part, will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to one embodiment of the present invention, there is provided an apparatus for controlling a traffic information display in a navigation system, comprising: a GPS receiver for receiving location data from a plurality of GPS satellites; a storage means for storing map data and information on colors, the colors being different from each other based on degrees of vehicle congestion; a display means for displaying the colors based on the degrees of vehicle congestion on a travel route of a moving object, and a voice processing means for processing and outputting a voice signal; an input means for receiving a variety of input key signals and setting levels based on the degree of vehicle congestion; a wireless communication means for receiving traffic information messages from a traffic information center, the traffic information messages including traffic information on sections of the travel route; and a control means for controlling each means and performing a control operation of displaying different colors on the corresponding sections of the travel route based on the traffic information on the sections of the travel route.

According to another embodiment of the present invention, there is provided a system for controlling a traffic information display in a navigation system, comprising: a traffic information center for establishing a database by collecting traffic information based on travel conditions of moving objects and providing a traffic information service using the established traffic information; a navigation system installed in the moving object, for displaying a current location and travel route using location data received from a plurality of GPS satellites and map data stored in a storage medium, and displaying colors based on respective sections of the travel route using the traffic information service received from the traffic information center; and a mobile communication network for enabling communication of the navigation system and the traffic information center.

According to another embodiment of the present invention, there is provided a method for controlling a traffic information display in a navigation system, comprising the steps of: if a travel route is received from a user of a moving object, displaying and guiding a corresponding travel route; checking whether or not traffic density information is requested during travel of the moving object; if the traffic density information is requested, receiving the traffic density information of the travel route from a traffic information center and searching for a predetermined color, the color being stored in a storage means based on the received traffic density information; and displaying the predetermined color on the corresponding section of the travel route.

When a moving object having the navigation system of the present invention is traveling, different colors are displayed on respective sections according to traffic densities along a travel route. Therefore, while viewing color information, a user can recognize traffic densities of an intended section in real time, such that much better service is provided.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention, are incorporated in and constitute a part of this application, illustrate embodiment(s) of the present invention and together with the description serve to explain the principles of the present invention. In the drawings.

DETAILED DESCRIPTION OF THE PREFERRED EMBODIMENTS

Reference will now be made in detail to an exemplary embodiment of the present invention with reference to the attached drawings.

Figure 1:
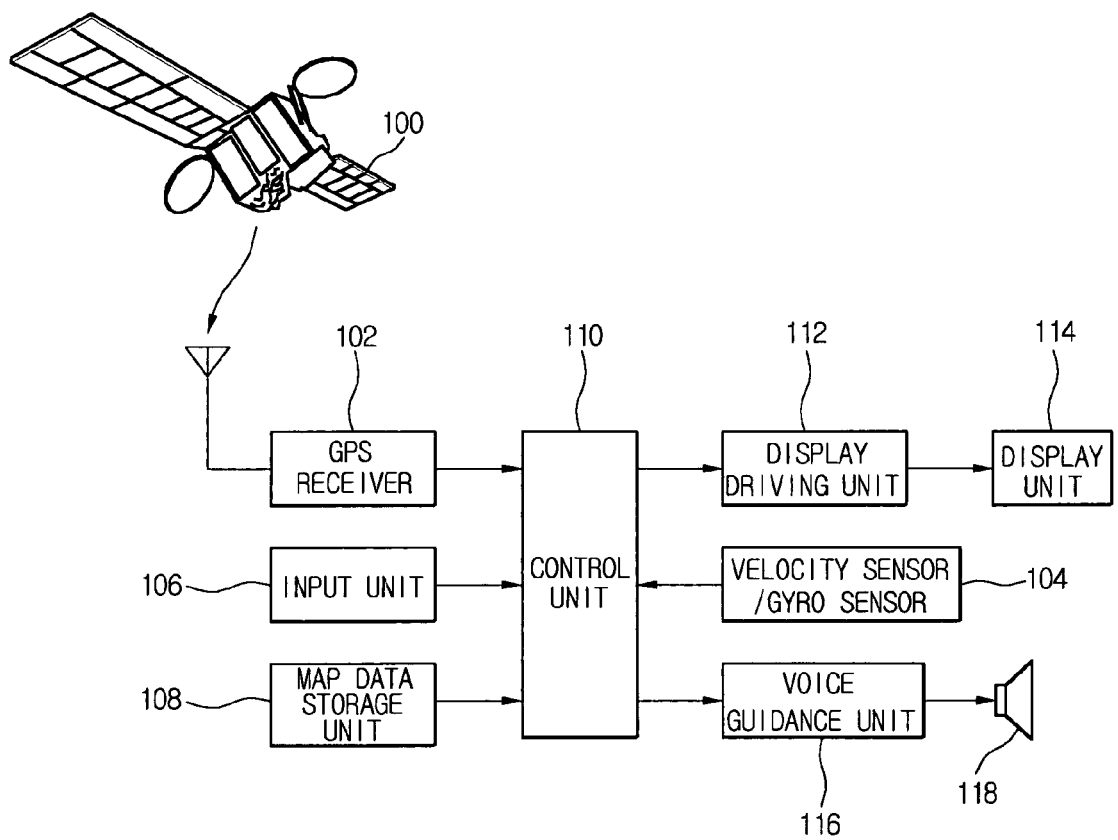
FIG. 1 illustrates a construction of a related navigation system.
Figure 2:
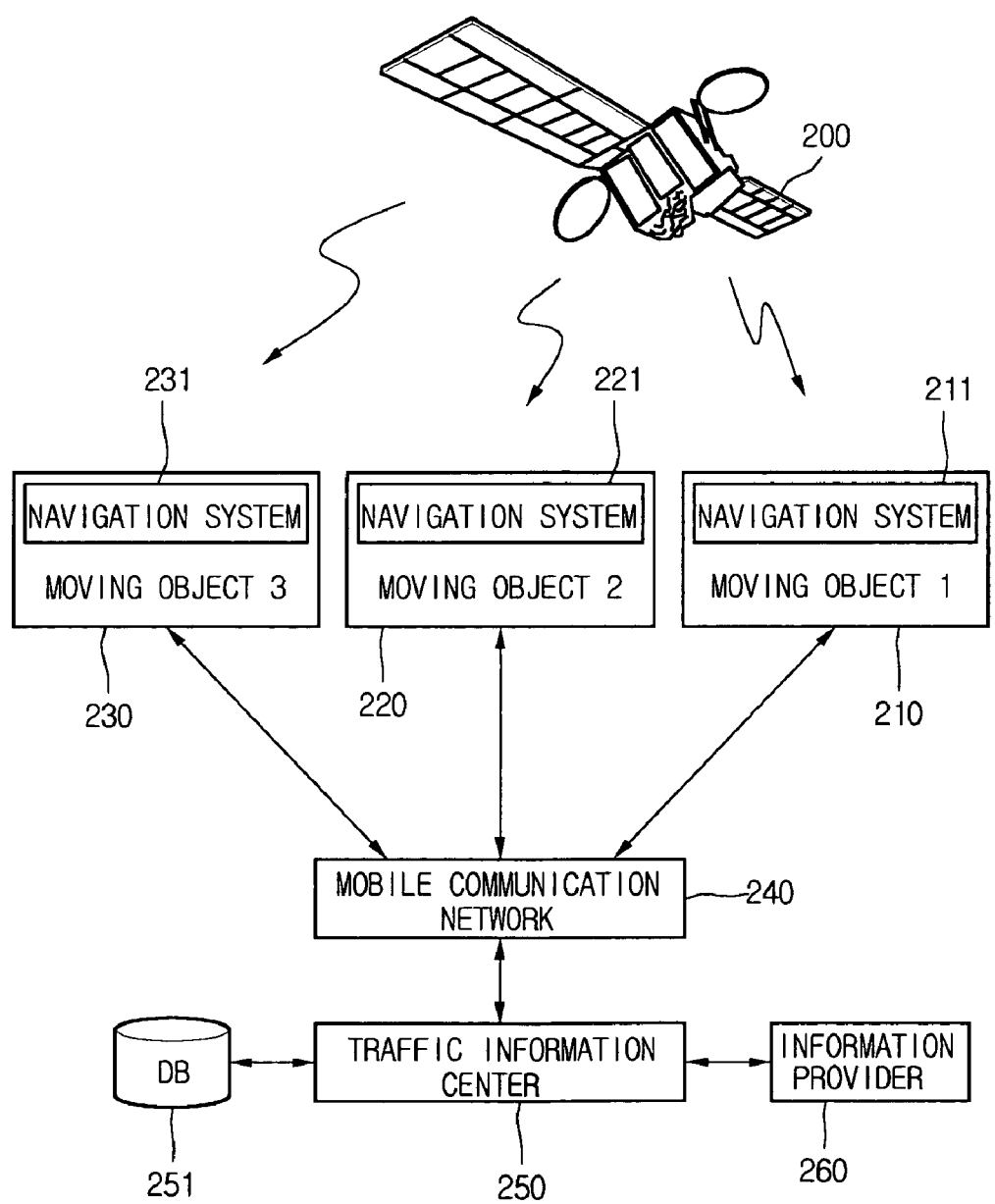
FIG. 2 illustrates a service network of a navigation system according to an exemplary embodiment of the present invention.

As shown in FIG. 2, a navigation system according to the present invention includes: navigation systems 211, 221 and 231 installed in moving objects 210, 220 and 230 to search a travel route by using location data received from a plurality of GPS satellites 200 and map data stored in a storage medium (CD, DVD, etc.), and to display a travel route on a screen; a mobile communication network 240 for enabling wireless communication among the navigation systems 211, 221 and 231; a traffic information center 250 including a database 251, for collecting and providing traffic information and location information to the navigation systems 211 and 221; and an information provider 260 for providing various kinds of information requested by the traffic information center 250.

An operation of the navigation system constructed as above will be described below.

Referring to FIG. 2, the navigation systems 211, 221 and 231 are installed in the moving objects 210, 220 and 230 and detect the current locations of the moving objects 210, 220 and 230 by using the location data received from the plurality of GPS satellites 200 and signals sensed by a plurality of sensors, such as a gyro sensor for sensing a direction of travel of the moving object and a velocity sensor for sensing a travel velocity of the moving object.

The navigation systems 211, 221 and 231 map-match the detected current locations of the moving objects 210, 220 and 230 with the map data stored in the storage medium (CD, DVD, etc.), and search a travel route from the current location of the moving objects to the destination by using the map data. Additionally, the navigation systems have functions of searching for and guiding a moving object along an optimum route, which allow the moving object to travel to the destination along the searched travel route.

Further, the navigation systems 211, 221 and 231 request service information, such as real-time traffic information, route guidance information and telephone connection information, to the traffic information center 250 through the mobile communication network 240. Additionally, the navigation systems 211, 221 and 231 receive traffic information service from the traffic information center 250 through the mobile communication network 240.

The mobile communication network 240 is a communication network including a base station system, a switching center, and the like. The base station system registers locations of wireless communication equipment existing in control areas under the control of an upper control station, and enables wireless communication with wireless communication equipment, such as a wireless navigation system and a wireless terminal.

The traffic information center 250 establishes a database 251 by collecting a variety of traffic information in real time, and provides traffic information or traffic conditions in real time when the navigation systems 211, 221 and 231 request traffic information.

For this purpose, the traffic information center 250 establishes database 251, which includes information on traffic density based on sections of a road and information on degrees of traffic congestion and velocity, and executes the traffic information service to the moving object through the wireless communication network.

The information provider 260 provides geographical information, traffic information and a variety of Internet information to the traffic information center 250.

If the moving object requests the degree of congestion of a section of an intended travel route, the traffic information center uses the database to search for a value that indicates the degree of congestion of the requested section, and transmits the value determined by the search to the corresponding moving object over the traffic information message.

The moving object displays the degree of congestion information of the traffic information message on a corresponding section of the map information. For example, the degree of congestion information may be displayed with different colors or different road widths based on the degree of congestion of the sections.

Figure 3:
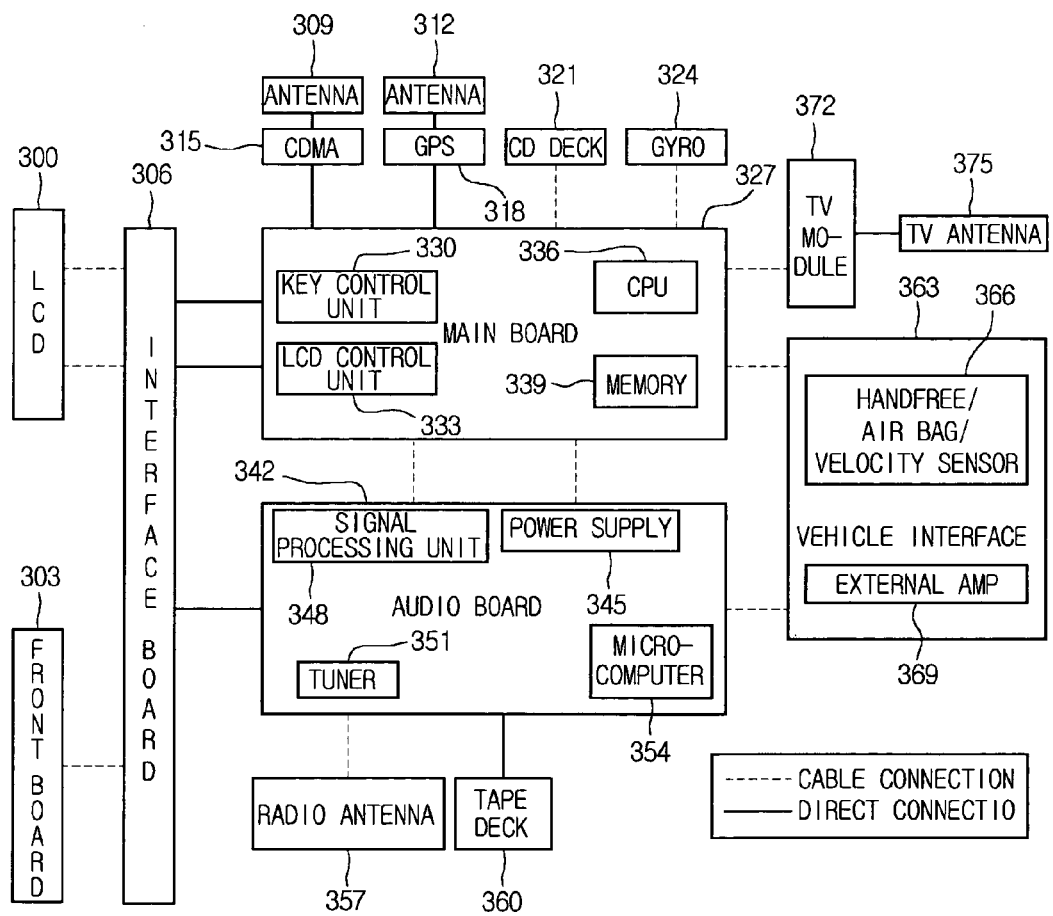
FIG. 3 illustrates a detailed construction of a navigation system according to an exemplary embodiment of the present invention.

FIG. 3 is a block diagram of a navigation system according to the present invention.

Referring to FIG. 3, the navigation system includes an interface board 306, a main board 327, an audio board 342 for processing an audio signal, and a vehicle interface 363.

The interface board 306 is connected to the main board 327, the audio board 342, an LCD 300 and a front board 303 and performs an interface function therebetween.

The main board 327 includes a central processing unit (CPU) 336 for controlling the system, a memory 339 provided for storing the map information which is necessary to display the information and travel route guidance on the map according to the current traffic condition of a road where the moving object travels; an input key control unit 330 for controlling an input key signal; and an LCD control unit 333 for controlling a display operation of an LCD.

The main board 327 is connected via cable or directly to a CDMA communication unit 315, a GPS receiver 218 for receiving GPS signals, a CD deck 321 for reproducing and recoding signals of disk (CD, DVD, etc.), and a gyro 324. Here, the CDMA communication unit 315 is a mobile communication terminal having an equipment identification number. The CDMA communication unit 315 and the GPS receiver 318 receive signals through antennas 309 and 312, respectively.

Additionally, a TV module 372 is connected to the main board 327 to receive TV signals through a TV antenna 375. The LCD 300 and the front board 303 are connected to the main board through the interface board 306. The LCD 300 and the front board 303 are controlled by the LCD control unit 333 and the input key control unit 330, respectively.

The LCD 300 functions to display a variety of video, including character, signals. The front board 303 includes various input buttons and/or keys and provides a corresponding signal of a selected input button and/or key to the main board 327. The front board 303 includes a menu key or button for directly receiving the traffic information according to an embodiment of the present invention.

The audio board 342 interfaces with the main board 327 and includes a microcomputer 354, a tuner 351 for receiving a radio signal, a power supply 345, and a signal processing unit 348 for processing signals to output a variety of audio signals.

Additionally, a radio antenna 357 for receiving a radio signal, a tape deck 360 for reproducing an audio tape, and an amp 369 for outputting an audio signal are connected to the audio board 342. The audio board 342 is connected to the interface board 306.

The vehicle interface 363 is an interface means for transmitting/receiving signals to/from the amp 369 and hand-free/air bag/velocity sensor 366, which are mounted on the moving object. The vehicle interface 363 transmits/receives signals to/from the audio board 342 and the main board 327. The velocity sensor is provided for sensing the velocity of the moving object, the air bag is provided for securing a safety feature, and the hand-free 366 is provided for receiving an audio signal without using the driver's own hands. They are connected to the vehicle interface 363. The velocity sensor provides the velocity information to the central processing unit 326 in order to sense the velocity of the moving object.

The navigation system is a combination system that can provide a variety of wireless data services, mobile communication and broadcasting reception through a connection to a variety of audio and video devices and an addition of a telematics function, as well as the navigation service of the moving object.

For the purpose of the mobile communication service, the CDMA communication unit 315 wirelessly transmits/receives signals to/from the mobile communication network through the antenna 309. The received signal is transmitted to the audio board 342 under control of the central processing unit 327 and then processed through the signal processing unit 348 of the audio board 342. Then, the processed signal is outputted through the amp 269 under control of the microcomputer 354.

The TV signal received through the TV antenna 375 for the purpose of receiving TV broadcasting is processed through the TV module 372. The processed TV reception signal is displayed in a form of a video signal on the LCD 300 through the interface board 306 under control of the LCD control unit 333. Additionally, the audio signal of the TV reception signal is outputted through the audio board 342 and the amp 369.

An audio signal of the radio signal that is received through the tuner 351 for the purpose of receiving radio broadcasting and an audio signal of an audio tape that is received through the tape deck 360 are outputted through the audio board 342 and the amp 369. The audio signal reproduced through the deck 321 is also outputted through the amp 369, and a variety of the video signals are displayed on the display unit, i.e., the LCD 300.

A method for displaying a state of a travel route in the navigation system of the present invention will be described with reference to FIGS. 3 and 4.

Figure 4:
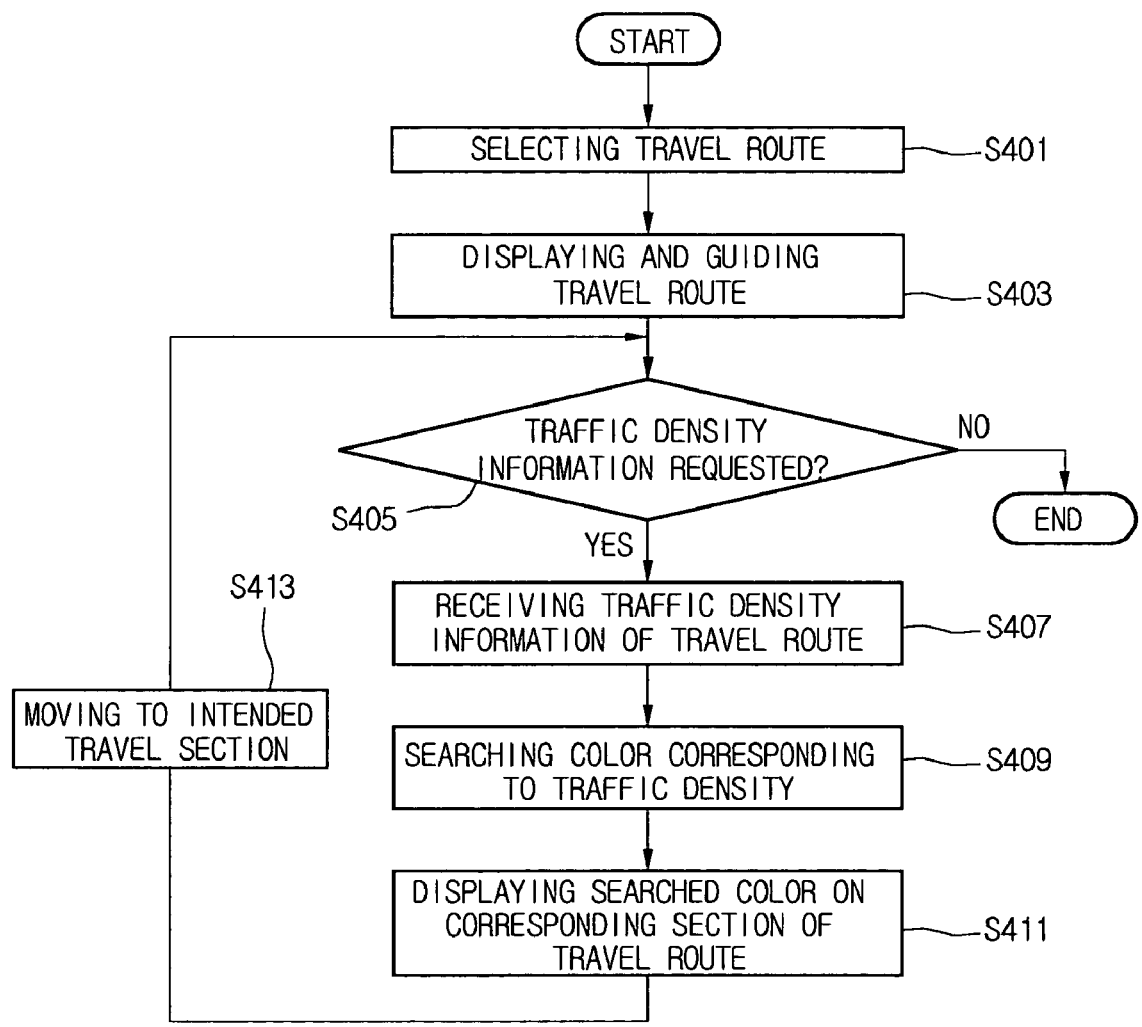
FIG. 4 is a flowchart illustrating a method for controlling a traffic information display in the navigation system according to an exemplary embodiment of the present invention.

Referring to FIGS. 3 and 4, a user selects a menu through a menu key provided in the front board 303 and inputs an origin and a destination of a travel route. The received signal is transmitted to the CPU 336 through the input key control unit 330 of the main board 327 connected to the interface board 306, thus requesting a travel route.

The CPU 336 tracks a travel trace by checking a current location and direction of travel of a moving object, based on the GPS signal. In addition, the CPU 336 searches a travel route from the received origin to the received destination and selects an optimum travel route (S401).

Under control of the CPU 336, the LCD control unit 333 reads out travel route data from the memory 339, displays the travel route data on the LCD 300 through the interface board 306, and guides the travel route according to the travel route data (S403).

Then, a determination is made concerning whether or not the user is requesting or has requested traffic density information with regard to a specific section of the travel route. If the user requests traffic density information, the traffic density information is sent to the traffic information center through the CDMA control unit 315 and the mobile communication network.

The traffic information center finds the traffic density information of the requested section among the information established in the database and transmits the traffic density information to the moving object over the traffic information message.

The CPU 336 of the moving object receives the traffic density information through the CDMA control unit 315 and searches for a color corresponding to the received traffic density (S409).

In order to display the degrees of congestion of the vehicles with different colors, reference values for the degrees of congestion corresponding to the respective colors are set in the memory 339. These values are used to control the color display based on the traffic states. For example, yellow, blue and red colors indicate a smooth traffic flow, a normal traffic flow and a traffic jam, respectively. Accordingly, the reference values for the degrees of congestion corresponding to respective colors are set in the memory 339.

Moreover, the reference values of the congestion degrees may be set in a product shipment or changed by the user. In other words, when the user intends to display the degree of congestion with a more distinctive color, the user can adjust the reference values of each color and its range.

If the color corresponding to the traffic density is determined based on the search in step S409, the determined color is displayed on the corresponding section. of the travel route (S411). The vehicle then moves to a next intended travel section in step S413, and then the process returns to step S405 of requesting the traffic density information of the corresponding section.

Figure 5:
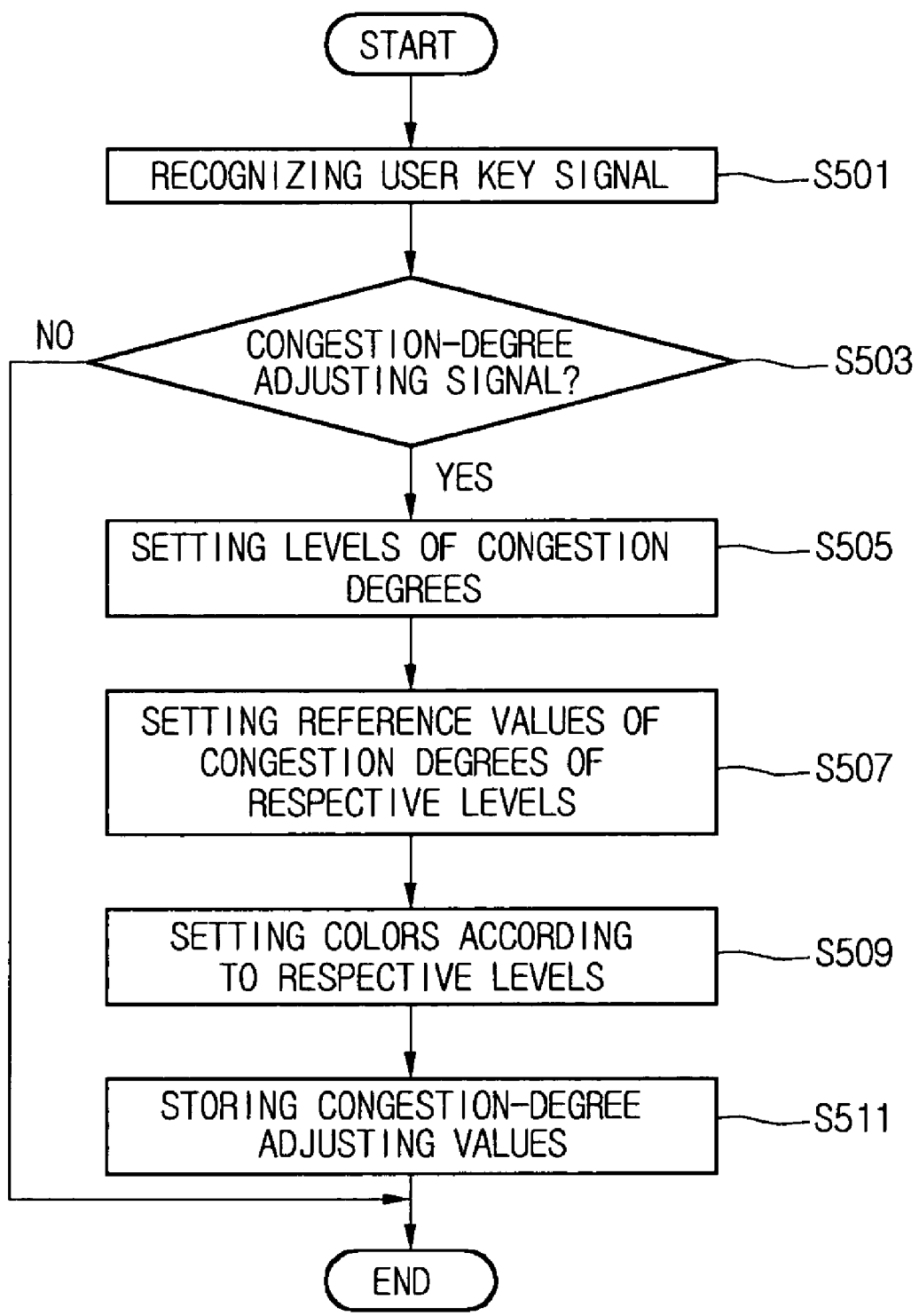
FIG. 5 is a flowchart illustrating a method for setting colors based on congestion degree of a travel route according to an exemplary embodiment of the present invention.

FIG. 5 is a flowchart illustrating a method for adjusting colors based on the degrees of congestion according to the present invention.

Referring to FIG. 5, if an input key signal inputted by the user is a degree-of-congestion adjusting signal (S501, S503), a display menu for setting colors based on the respective levels is displayed. At this time, the respective degree-of-congestion levels of the vehicles are set (S505), and the reference values of the degrees-of-congestion are set with respect to the set levels (S507).

The levels set based on the degrees of congestion in the step S503 are set to the intended levels on the menu screen. In other words, in case a very detailed level is desired, a value P is selected, and in case a level lower than P is desired, a value P-n is selected. In case a level lower than P-n is desired, a value P-n-n is selected. Because level intervals of the selected values are P<P-n<P-n-n, the total number of the levels of the degrees of congestion is determined.

In step S505, the reference values of the degrees of congestion based on the respective levels are set. These reference values may be set automatically or may be adjusted by the user. For example, if the user wants to display the respective levels with five gradual colors, the reference values can be set according to the degrees of congestion by dividing the respective colors into five. Here, the reference values for setting the reference of the congestion degrees are provided.

Figure 6:
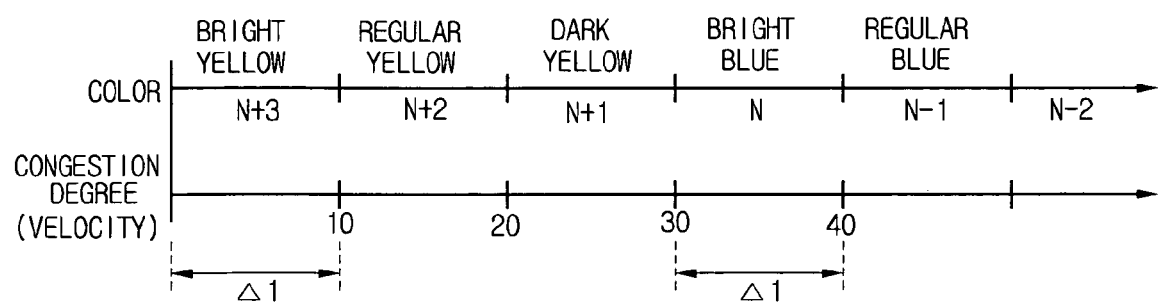
FIG. 6 exemplarily illustrates a setting of color based on congestion degree according to an exemplary embodiment of the present invention.

In other words, the intervals $\Delta 1$ and $\Delta 2$ of the degrees of congestion are adjusted by controlling the respective levels of the degrees of congestion, as shown in FIG. 6. The total number (N+3, N+2, ..., N-2, ...) of the set levels is determined by the intervals of the degrees of congestion. The reference values of the degrees of congestion determine how many levels one color will be divided into according to the degrees of congestion of the vehicles. For example, if the reference values of yellow color are set into three levels, the yellow color may be displayed with a bright yellow color, a normal yellow color and a dark yellow color, i.e., with respect to different values of color lightness or brightness.

Then, while viewing the display menu, the user sets the colors based on the respective degree-of-congestion levels (S509) Previously set colors can be sequentially applied based on the respective degree-of-congestion levels or the user can selectively set the respective colors based on the respective degree-of-congestion levels. In other words, the colors based on the degree-of-congestion levels, which are set with seven colors (red, orange, yellow, green, blue, dark blue, and purple colors), can be adjusted with five levels (red, orange, yellow, green and blue colors). Additionally, the user can directly set yellow color as the first level, blue color as the second level, and orange color as the third level.

In the degree-of-congestion level and color setting steps S505 to S509, the setting order may be set arbitrarily, or only a specific step (e.g., the step S509) may be carried out.

If the colors based on the respective degree-of-congestion levels are set, the degree-of-congestion adjusting values are stored in a predetermined area of the memory (S511) These colors are overlayed and displayed on the travel route of the map information.

Figure 7:
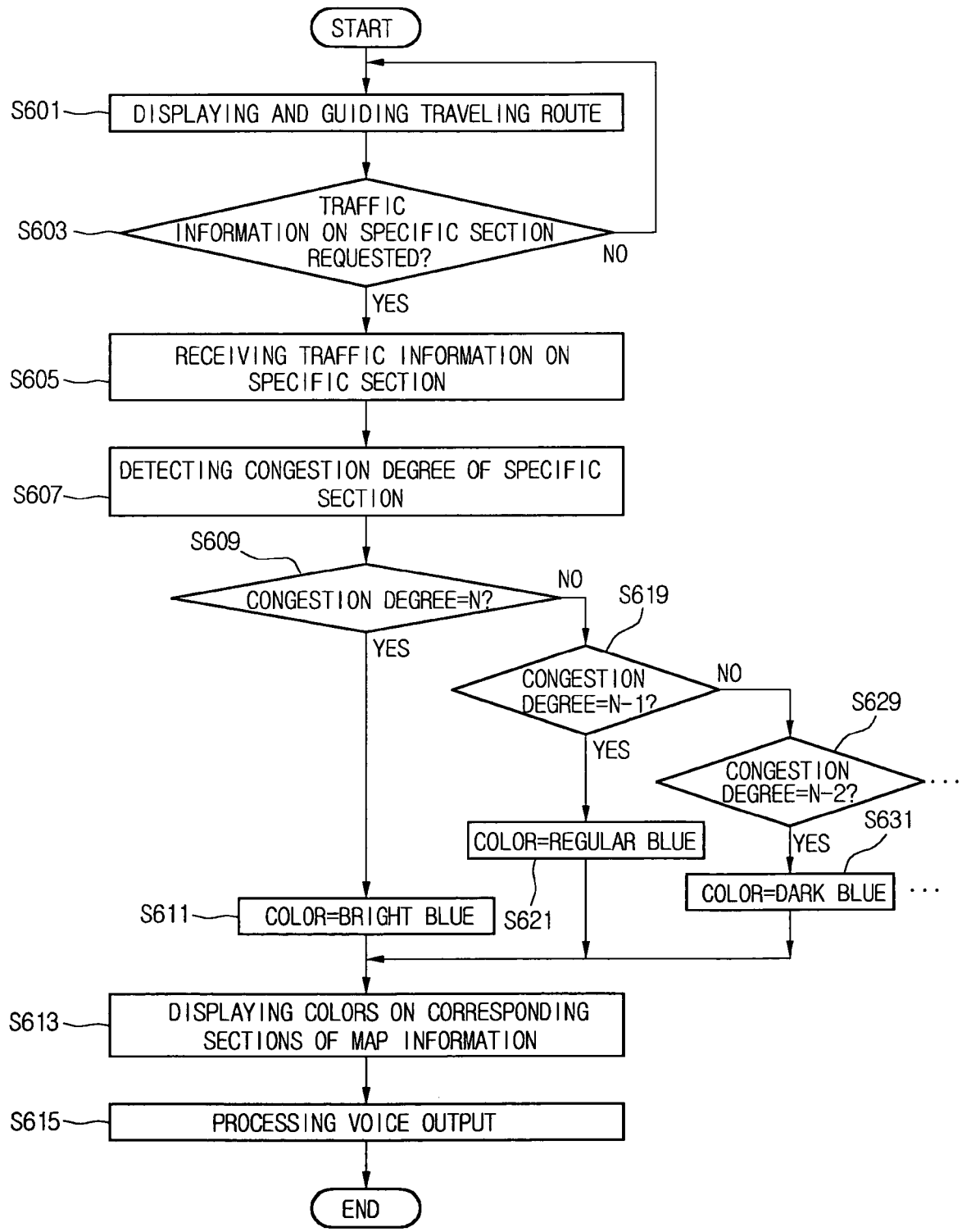
FIG. 7 is a flowchart illustrating a method for displaying colors based on congestion degree of a travel route according to an exemplary embodiment of the present invention.

FIG. 7 is a flowchart illustrating a method for controlling a traffic information display according to another exemplary embodiment of the present invention.

Referring to FIG. 7, the navigation system displays the current travel route of the moving object on the screen and guides the user to the travel route (S601). At this time, a determination of made concerning whether or not the user is requesting or has requested the traffic information of a corresponding section for the purpose of receiving the traffic density information of a specific section (S603).

The specific section may be an intended travel section or may be not a travel route but an arbitrarily designated section.

If the traffic information on the specific section is requested in the step S603, the traffic information message about the specific section is received from the traffic information center and the degree of congestion of the specific section is detected from the received traffic information message (S607) Then, a color is displayed based on the degree of congestion of the specific section.

In other words, a determination is made concerning whether or not the degree of congestion corresponds to a predetermined level (N, N-1, N-2) (S609, 619, S629). If the level of the degree of congestion is determined, a color corresponding to the level is read out (S611, S621, S631). That is, if the degree of congestion is a level N, a bright blue is read out, and if the degree of congestion is a level N-1, a regular blue is read out.

In this manner, if color information about the level of the degree of congestion with respect to the specific section is determined, the specific section is displayed with the corresponding color. In other words, the user can visually recognize the level of the degree of congestion with respect to the specific section by displaying the corresponding color on the map.

Additionally, if a voice message with respect to the specific section is received together with the traffic density information, a voice is outputted together with the color display (S615).

Meanwhile, the traffic information center collects the travel velocity data from the navigation systems of the moving objects, establishes a database and provides the navigation service. If the traffic information on a specific section is requested, the navigation system of the moving object displays a corresponding color on the screen using the current travel velocity.

A detailed description of this feature will be made below with reference to FIG. 8.

Figure 8:
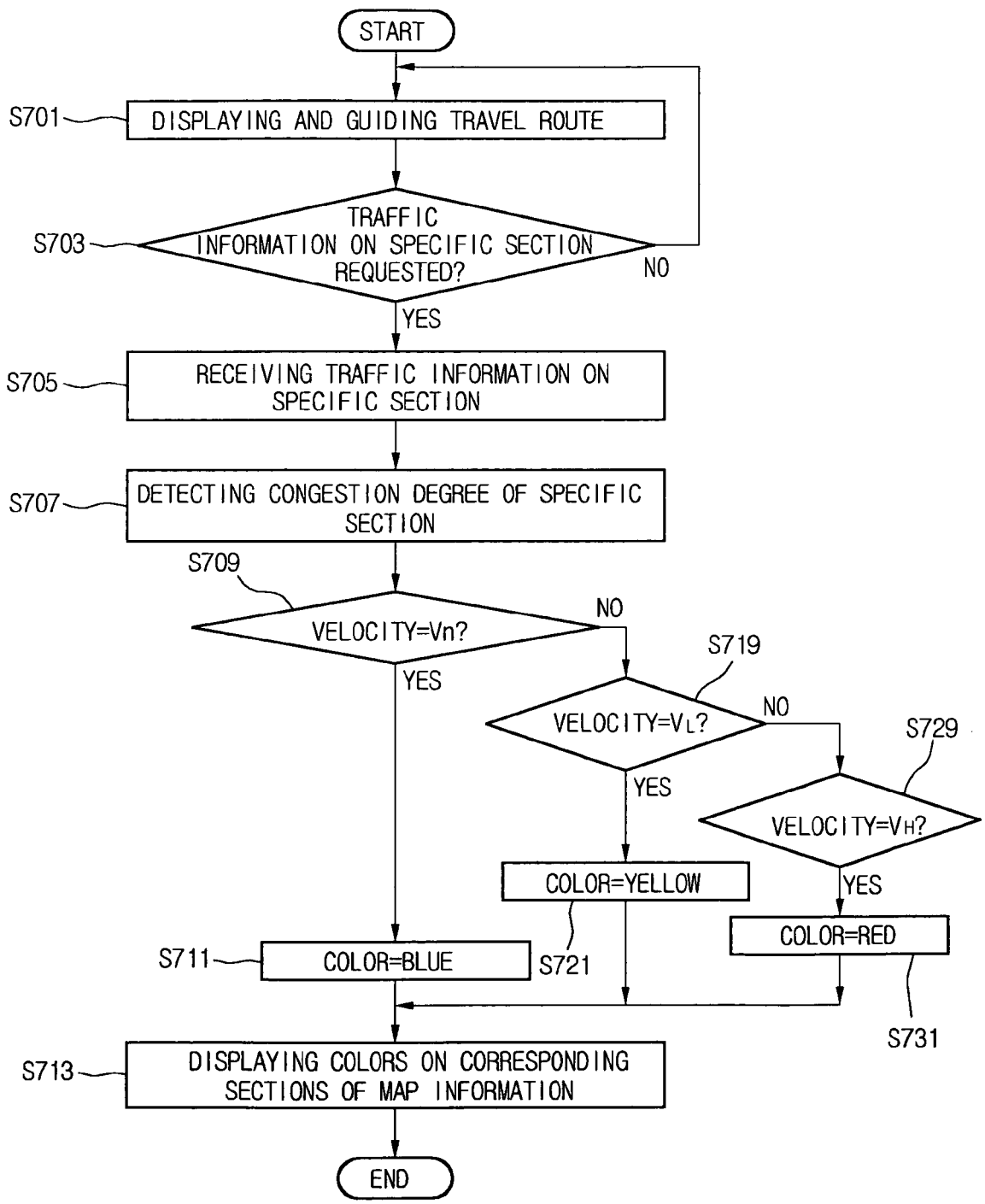
FIG. 8 is a flowchart illustrating a method for displaying colors based on travel velocity according to an exemplary embodiment of the present invention.

FIG. 8 is a flowchart illustrating a method for displaying states of the travel route according to another embodiment of the present invention. Velocity information service is received from the map information in order to display colors based on velocity levels of specific sections, and the velocity information is displayed with different colors based on degree of difference between the velocity level of a specific section and a regular velocity for that section.

As shown in FIG. 8, the map information and the travel route are displayed on a screen to guide the user to the destination through guidance of the travel route (S701, S703). At this time, if the user requests traffic information on the specific section, the traffic information on the specific section is received and a current traffic velocity of the specific section is detected from the received traffic information (S705, S707).

Regular velocity is set at the respective sections of the road, and a ratio of the current traffic velocity to the regular velocity is calculated. Then, it is checked whether or not the current traffic velocity is lower than, equal to, or higher than the regular velocity (S709, S719, S729).

At this time, if the current traffic velocity is within an error range from the regular velocity (that is, velocity=$V_n$), a blue color is read out (S711). If the current traffic velocity is lower than the regular velocity (that is, velocity=$V_L$), a yellow color is read out (S721). If the current traffic velocity is higher than the regular velocity (that is, velocity=$V_H$), a red color is read out (S731).

If the color information based on the level of the traffic velocity of the specific section is read out, the corresponding sections of the map information are displayed with the colors (S713).

Here, the colors based on the velocity levels of the specific sections can be set by the user. In other words, the velocity levels are subdivided, like whether or not the current traffic velocity is within the reference error range, lower than the regular velocity, or higher than the regular velocity. Then, the colors based on the respective velocity levels are designated.

According to another embodiment of the present invention, the traffic information center establishes the database by classifying the current traffic conditions into normal, slow, delayed, and congested conditions. In case the traffic information service is executed using the traffic states, the different colors are displayed based on the respective travel states.

Figure 9:
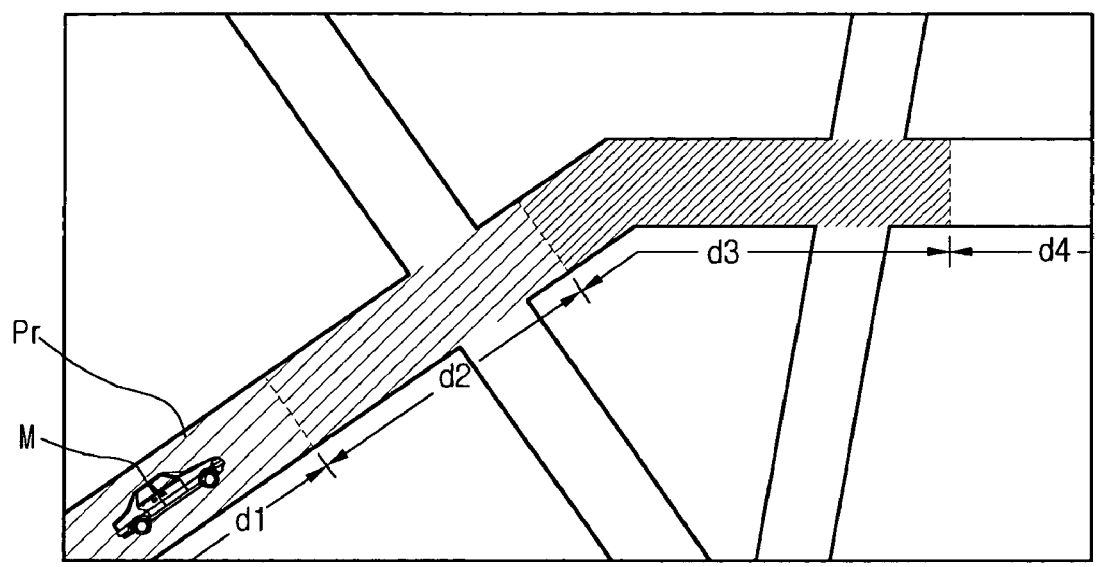
FIG. 9 exemplarily illustrates a display of color based on sections of a travel route according to an exemplary embodiment of the present invention.

If the colors are displayed on the travel route based on the sections in the above manner, the travel route Pr of the moving object M is displayed with different colors with respect to the sections d1, d2 and d3, as shown in FIG. 9. Since the user can visually recognize the travel route, more convenient service can be provided to the user.

In addition, while the current location of the moving object is displayed along the travel route, the traffic information on the next intended section (area) can be displayed with a different color characteristic, e.g., color saturation, in sequence and in real time, thereby providing convenient service to the user.

Further, the traffic density information based on the predetermined intervals of the travel route (that is, the interconnecting intervals) can be automatically requested and received. The traffic density can be displayed with the differently set colors by comparing the received traffic density information with the set reference value.

According to the method of the present invention, the traffic information of the specific area and section desired by the user can be displayed with the color information and voice, thereby providing more convenient service to the user.

The traffic information center collects a variety of traffic density information and establishes the database. If the user of the navigation system requests information on specific section, road and line, the requested information is displayed with color information using the current traffic density information with respect to the corresponding section, such that the user can visually receive the traffic density information on the specific area.

Further, the information on the travel route is displayed visually and audibly, thereby improving the convenience in the use of the system and increasing user satisfaction with the functions of the system.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for controlling a traffic information display in a navigation system, the apparatus comprising:
   a GPS receiver configured to receive location data from a plurality of GPS satellites;
   a storage unit configured to store map data and information on colors, the colors representing degrees of congestion of vehicles and being different from each other based on the degrees of congestion of vehicles;
   a display unit configured to display the colors based on the degrees of congestion on a travel route of a moving object;
   a voice processing unit configured to process and output a voice signal based on the degrees of congestion on the travel route of the moving object;
   an input unit configured to receive a variety of signals and setting levels based on the degree of congestion of vehicles;
   a wireless communication unit configured to receive a traffic information message from a traffic information center, the traffic information message including traffic information about sections of the travel route; and
   a control unit configured to control each aforesaid units and to perform a control operation of displaying different colors and outputting the voice signal related to corresponding sections of the travel route to indicate the traffic information about the sections of the travel route.

2. The apparatus according to claim 1, wherein the control unit performs a control operation of displaying the different colors that are set based on the degrees of congestion of the traffic information on the sections of the travel route, the traffic information being stored in the storage unit.

3. The apparatus according to claim 1, wherein the control unit performs a control operation of displaying the different colors that are set based on velocity data of the traffic information stored in the storage unit.

4. The apparatus according to claim 1, wherein the control unit performs a control operation of displaying the different colors based on traffic conditions of the traffic information stored in the storage unit, the traffic conditions including normal velocity, slow velocity, delayed velocity, and congested conditions.

5. The apparatus according to claim 1, wherein the control unit controls the display unit to overlap the information on the colors with the map information, the information on colors being displayed on the corresponding sections of the travel route.

6. The apparatus according to claim 1, wherein the control unit performs a control operation of displaying the different colors on corresponding sections of the travel route using at least one parameter of congestion degree based on sections of the travel route, velocity data based on sections of the travel route and traffic conditions based on sections of the travel route from a traffic information service.

7. A system for controlling a traffic information display in a navigation system for a moving object, the system comprising:
a traffic information center configured to establish a database by collecting traffic information based on travel conditions of moving objects and providing a traffic information service using the established traffic information;
a navigation system installed in the moving object, configured to display a current location and travel route using location data received from a plurality of GPS satellites and map data stored in a storage medium, configured to display colors based on respective sections of the travel route using the traffic information service received from the traffic information center, the colors representing degrees of congestion, and configured to output a voice signal based on the respective sections of the travel route using the traffic information service received from the traffic information center; and
a mobile communication network configured to enable communication of the navigation system with the traffic information center.

8. The system according to claim 7, wherein the navigation system displays different colors on corresponding sections of the travel route using at least one parameter of degree of congestion based on sections of a travel route, velocity data based on sections of a travel route and traffic conditions based on sections of a travel route, which are received from the traffic information service.

9. A method for controlling a traffic information display in a navigation system, the method comprising:
if a travel route is received from a user of a moving object, displaying and guiding a corresponding travel route;
determining whether or not traffic density information is requested during travel of the moving object;
if the traffic density information is requested, receiving the traffic density information of the travel route from a traffic information center and determining a predetermined color, the color representing a degree of traffic density based on the received traffic density information and being stored in a storage unit;
displaying the predetermined color on the corresponding section of the traveling route; and
outputting a voice signal based on the respective sections of the travel route using the traffic information service received from the traffic information center.

10. The method according to claim 9, wherein at least two colors representing degrees of traffic density based on the received traffic density information are displayed according to the traffic density information on sections of the travel route.

11. The method according to claim 9, wherein different colors are displayed according to levels of degrees of congestion based on the sections of the travel route among the traffic density information.

12. The method according to claim 9, wherein different colors are displayed according to velocity levels based on sections of the travel route among the traffic density information.

13. The method according to claim 9, wherein different colors are displayed according to traffic conditions based on the sections of the travel route among the traffic density information, the traffic conditions including normal velocity, slow velocity, delayed velocity, and congested conditions.

14. The method according to claim 9, wherein color information displayed on the travel route includes at least two color lightness or brightness information data and at least two color saturations.

15. The method according to claim 9, wherein colors are displayed based on sections of an intended travel route along a travel of the moving object in real time.

16. The method according to claim 9, wherein color information displayed on the travel route is set arbitrarily according to levels of the traffic density by a user.

17. The method according to claim 9, wherein the displaying step and the outputting step are simultaneously performed.

18. A system for controlling a traffic information display in a navigation system, the system comprising:
means for displaying and guiding a corresponding travel route if a travel route is received from a user of a moving object;
means for determining whether or not traffic density information is requested during travel of the moving object;
means for receiving the traffic density information of the travel route from a traffic information center and determining a predetermined color, the color representing a degree of traffic density based on the received traffic density information and being stored in a storage means if the traffic density information is requested;
means for displaying the predetermined color on the corresponding section of the traveling route; and
means for outputting a voice signal based on the respective sections of the travel route using the traffic information service received from the traffic information center.

19. The system according to claim 18, wherein at least two colors are displayed according to the traffic density information on sections of the travel route.

20. The system according to claim 18, wherein different colors are displayed according to levels of degrees of congestion based on the sections of the travel route among the traffic density information.

21. An apparatus for controlling a traffic information display in a navigation system, the apparatus comprising:
a GPS receiver configured to receive location data from a plurality of GPS satellites;
a storage unit configured to store map data;
a wireless communication unit configured to receive traffic information from a traffic information center, the traffic information including degrees of congestion on sections of a travel route of a moving object;
a voice processing unit configured to process and to output a voice signal; and a control unit configured to control the voice processing unit to output the voice signal indicating the degrees of congestion on the sections of the travel route of the moving object based on the traffic information.

22. The apparatus according to claim 21, wherein the storage unit stores information on colors, the colors being different from each other based on degrees of congestion of vehicles, the apparatus further comprising a display unit for displaying the travel route of the moving object, the control unit controlling the display unit to display different colors indicating the degrees of congestion on the sections of the travel route of the moving object based on the traffic information.

23. An apparatus for controlling a traffic information display in a navigation system, the apparatus comprising:

a GPS receiver configured to receive location data from a plurality of GPS satellites;
a storage unit configured to store map data;
a wireless communication unit configured to receive traffic information from a traffic information center, the traffic information including degrees of congestion on sections of a travel route of a moving object;
a display unit configured to display the travel route of the moving object; and
a control unit configured to control the display unit to display different widths of the sections of the travel route of the moving object indicating different degrees of congestion on the sections of the travel route of the moving object.

* * * * *